US008027451B2

(12) United States Patent
Arendsen et al.

(10) Patent No.: US 8,027,451 B2
(45) Date of Patent: Sep. 27, 2011

(54) ELECTRONIC CALL ASSISTANTS WITH SHARED DATABASE

(75) Inventors: Jeroen Arendsen, Delft (NL); Cornelia Johanna Gerritse-Van Bavel, Rotterdam (NL)

(73) Assignee: Koninklijke KPN N.V., The Hague (NL)

( * ) Notice: Subject to any disclaimer, the term of this patent is extended or adjusted under 35 U.S.C. 154(b) by 1226 days.

(21) Appl. No.: 11/687,896

(22) Filed: Mar. 19, 2007

(65) Prior Publication Data

US 2007/0165824 A1     Jul. 19, 2007

Related U.S. Application Data

(62) Division of application No. 10/168,370, filed as application No. PCT/EP99/10491 on Dec. 29, 1999, now Pat. No. 7,212,619.

(51) Int. Cl.
*H04M 3/42* (2006.01)
*H04M 11/00* (2006.01)

(52) U.S. Cl. ............ 379/218.01; 379/201.02; 379/88.18
(58) Field of Classification Search .... 379/88.13–88.22, 379/218.01–218.02, 201.01–201.02
See application file for complete search history.

(56) References Cited

U.S. PATENT DOCUMENTS

| 5,652,789 | A | 7/1997 | Miner et al. |
|---|---|---|---|
| 5,724,409 | A | 3/1998 | Malik et al. |
| 5,742,668 | A | 4/1998 | Pepe et al. |
| 6,064,723 | A | 5/2000 | Cohn et al. |
| 6,381,324 | B1 | 4/2002 | Shaffer et al. |
| 6,745,244 | B1 | 6/2004 | Cosgriff et al. |
| 7,103,589 | B1 | 9/2006 | Kepler et al. |
| 7,212,619 | B1 | 5/2007 | Gerritse-Van Bavel et al. |

FOREIGN PATENT DOCUMENTS

| EP | 0565850 | 10/1993 |
|---|---|---|
| EP | 0569164 | 11/1993 |
| EP | 0942574 | 9/1999 |
| WO | 1998/53586 | 11/1998 |

OTHER PUBLICATIONS

International Search Report for PCT/EP99/10491 mailed Jul. 7, 2000.
"The Electronic Receptionist. A Knowledge-Based Approach to Personal Communications," Bellcore Exchange, US, Bellcore, Livingston, NJ, pp. 1-8, (Jan. 1, 1994).

*Primary Examiner* — Rasha Al Aubaidi
(74) *Attorney, Agent, or Firm* — McDonnell Boehnen Hulbert & Berghoff LLP

(57) ABSTRACT

A telephone exchange (1) arranged to communicate with communication units (2, 3, 4, 5, 7) and to provide a plurality of electronic call assistants to the communication units, a first electronic call assistant (12) being provided to a first communication unit (2) and a second electronic call assistant (14) to a second communication unit (4), the first electronic call assistant (12) having access to a distinct first database (36), the second electronic call assistant (14) having access to a distinct second database (38), wherein the first (12) and second (14) electronic call assistants share a common database (40).

17 Claims, 12 Drawing Sheets

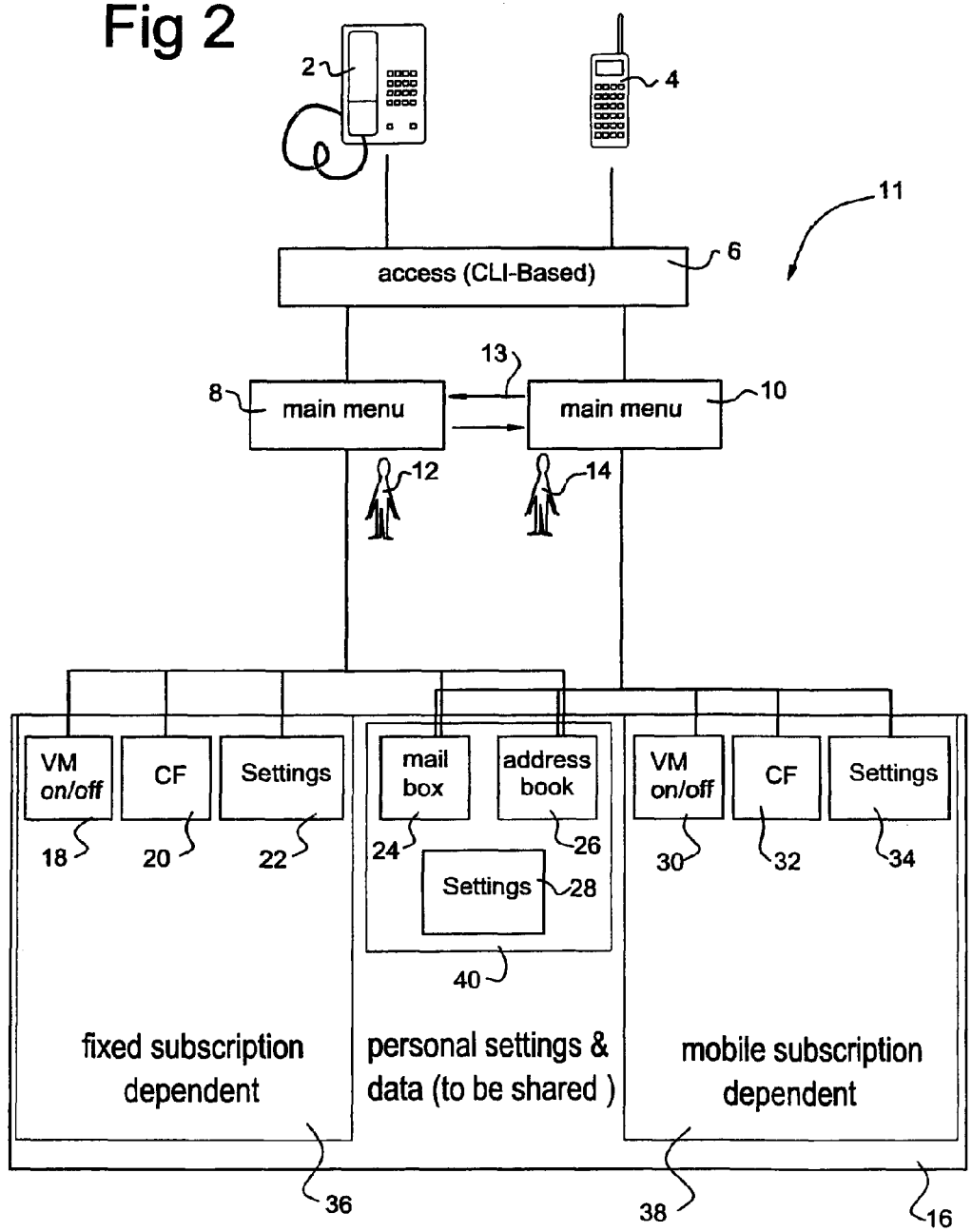

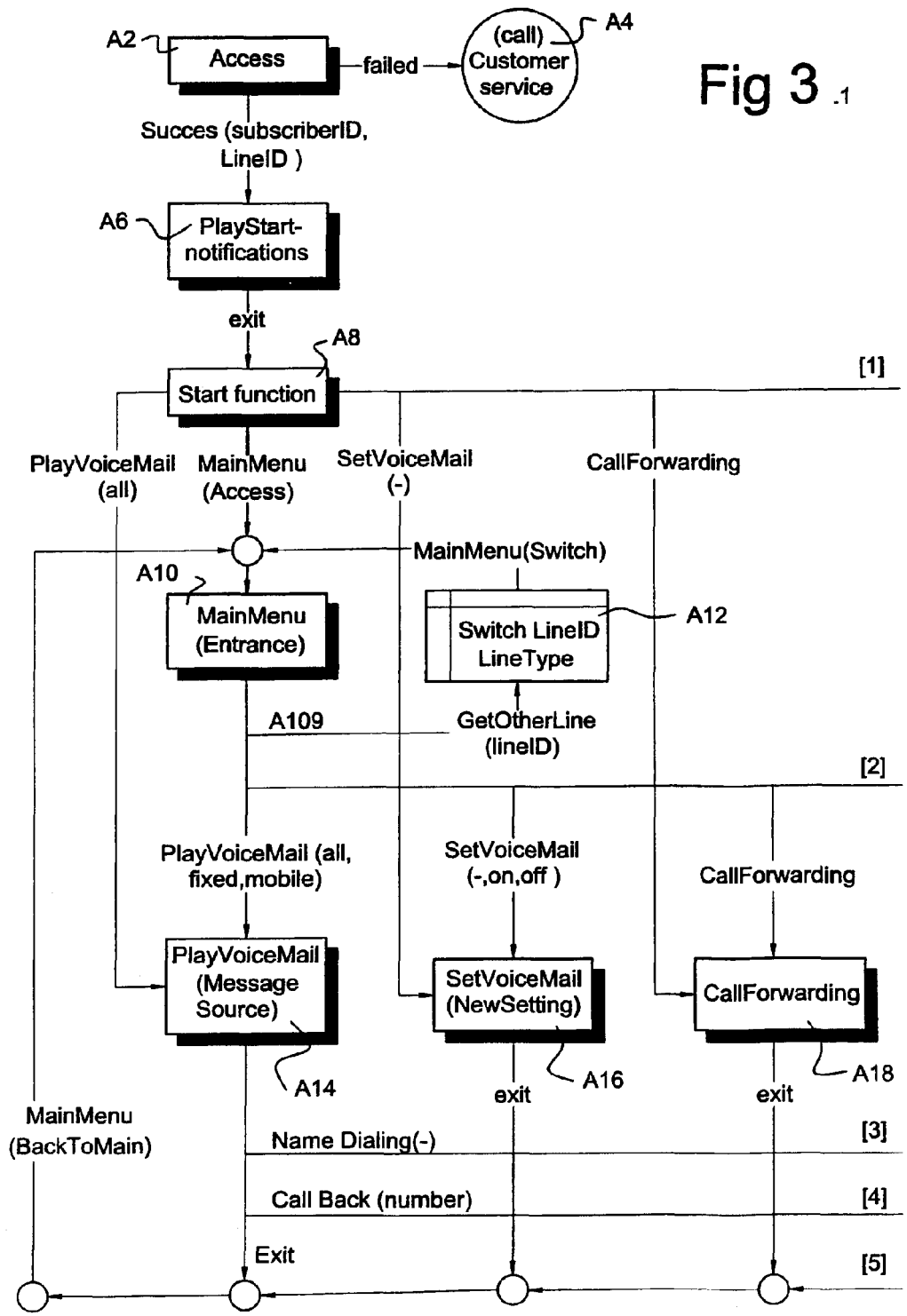
Fig 3.1

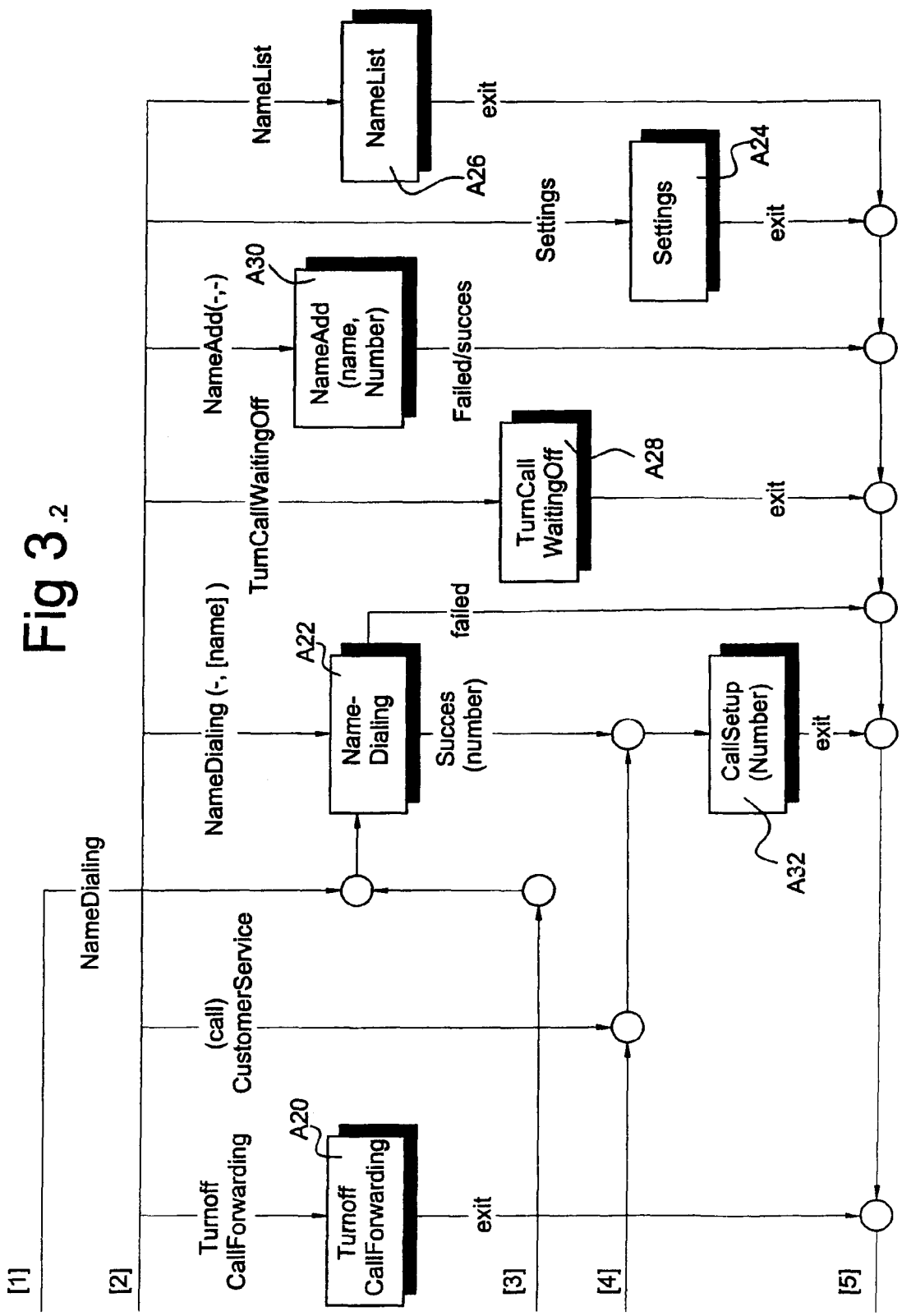

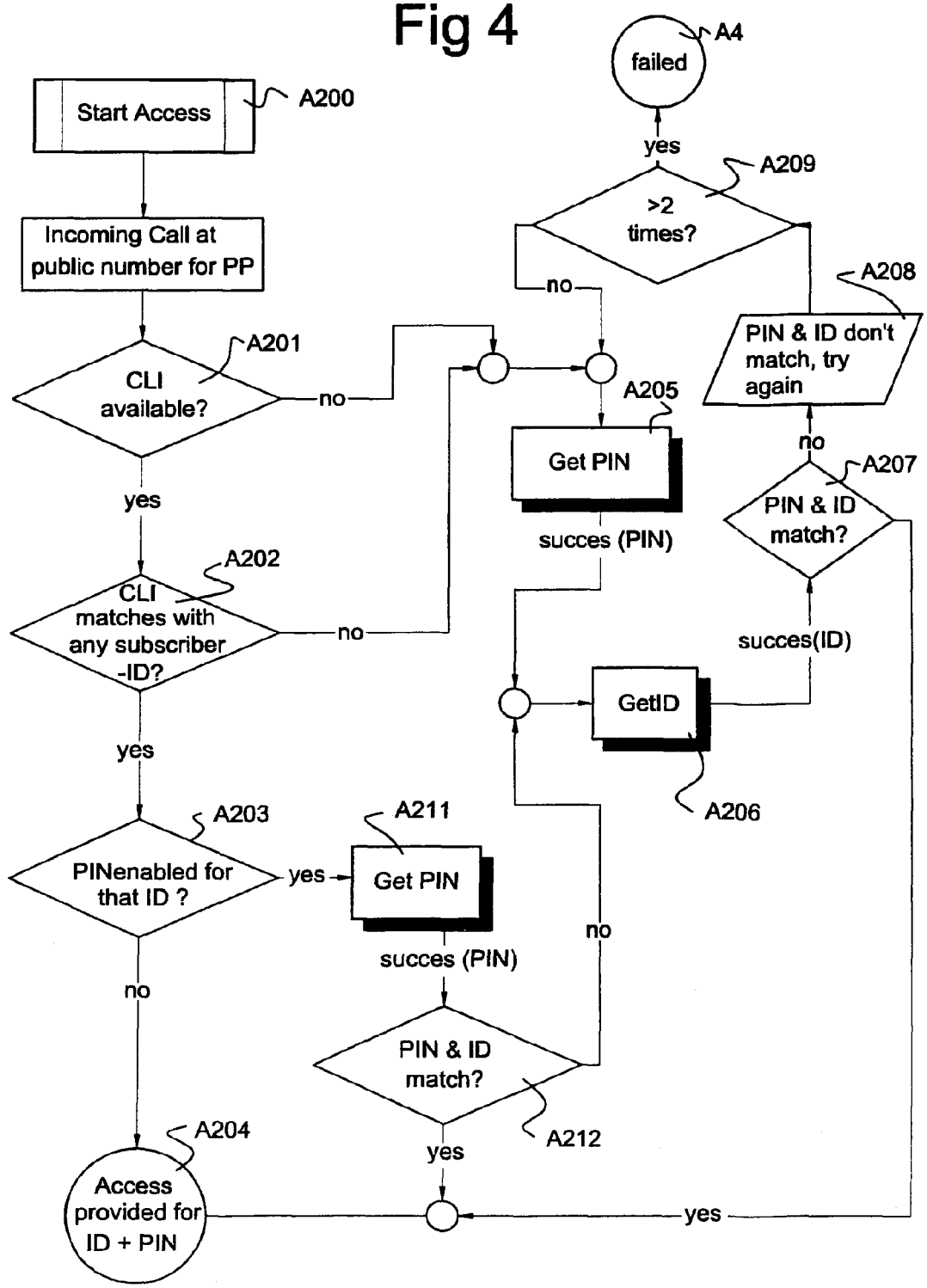

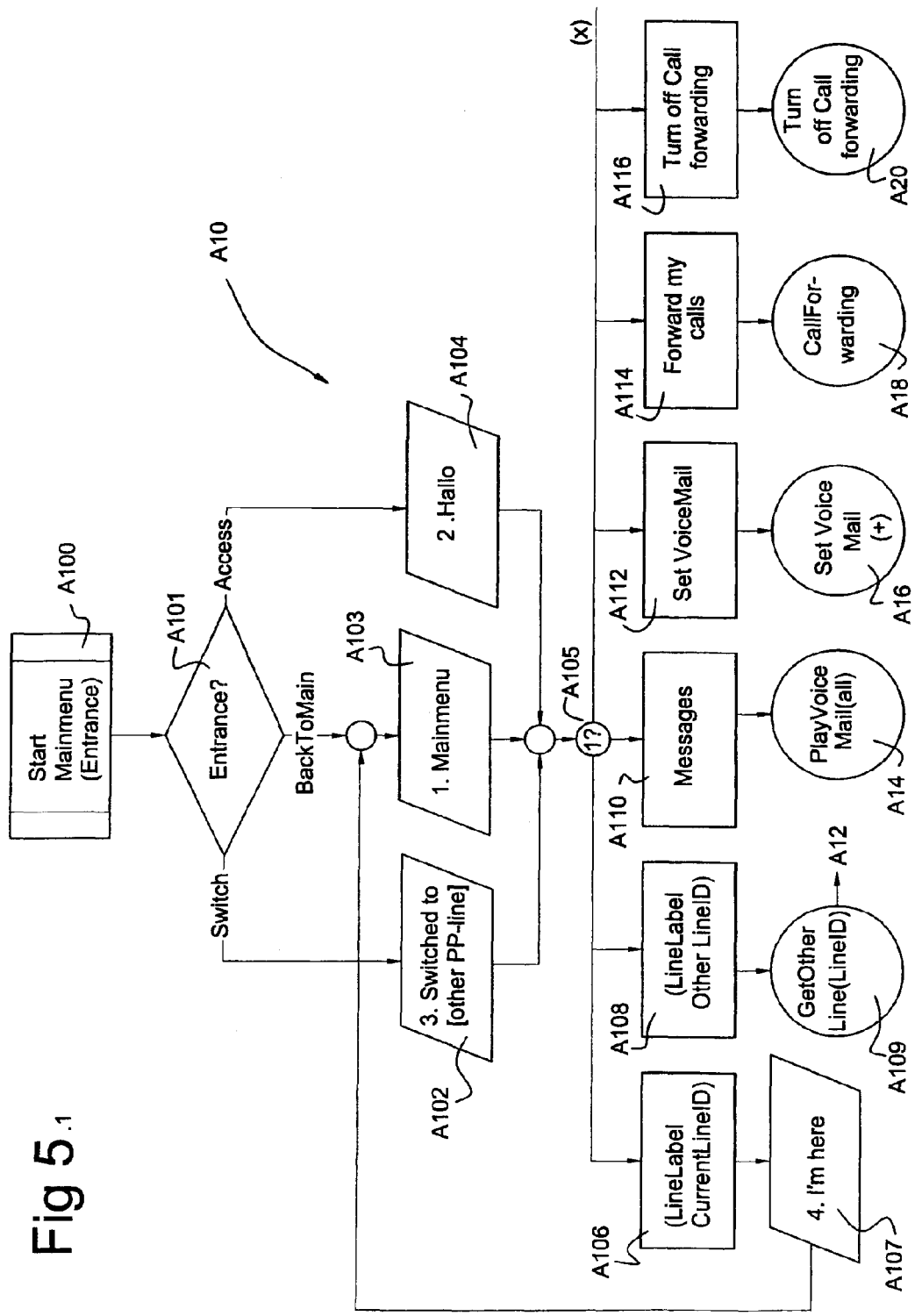
Fig 5.1

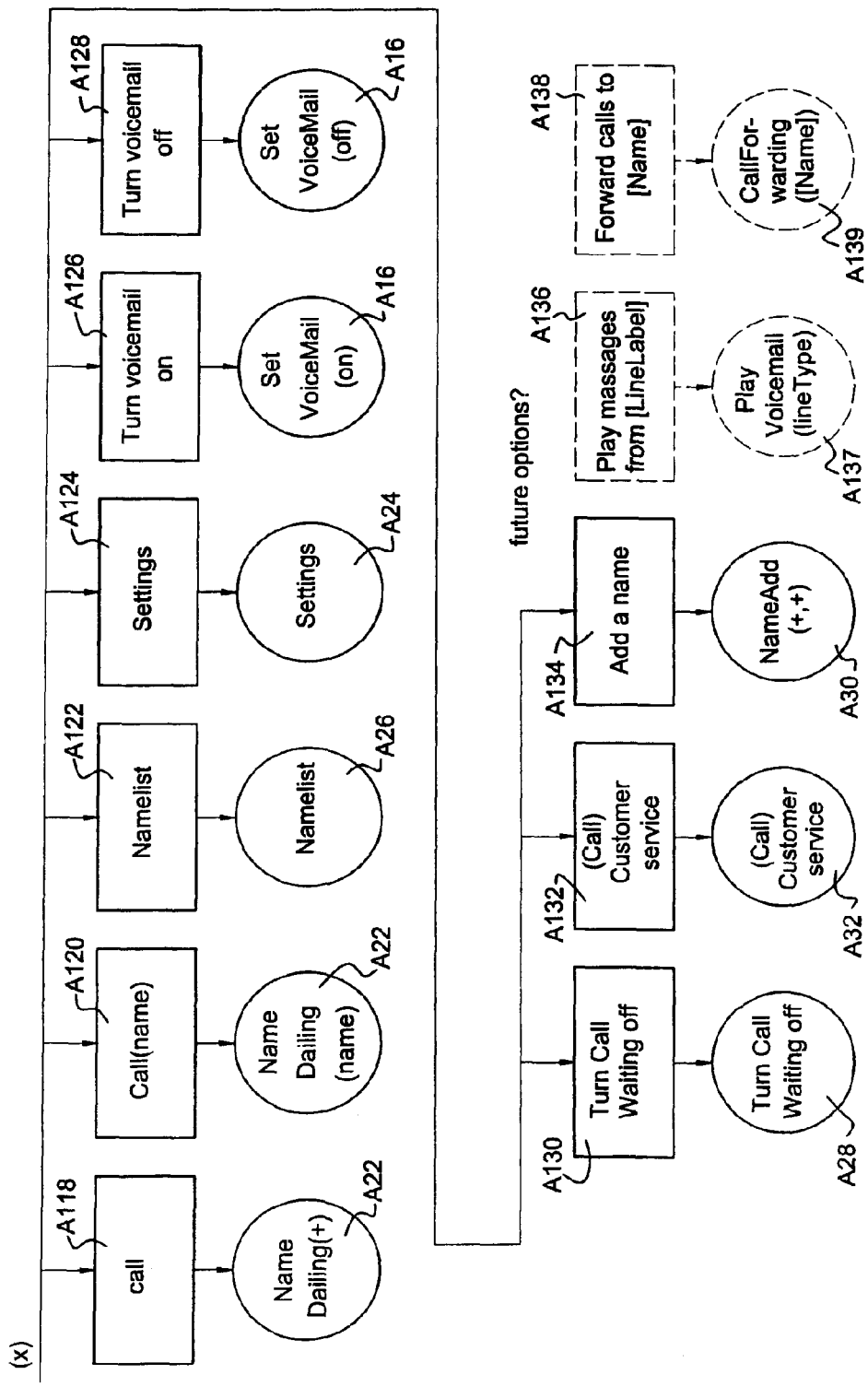

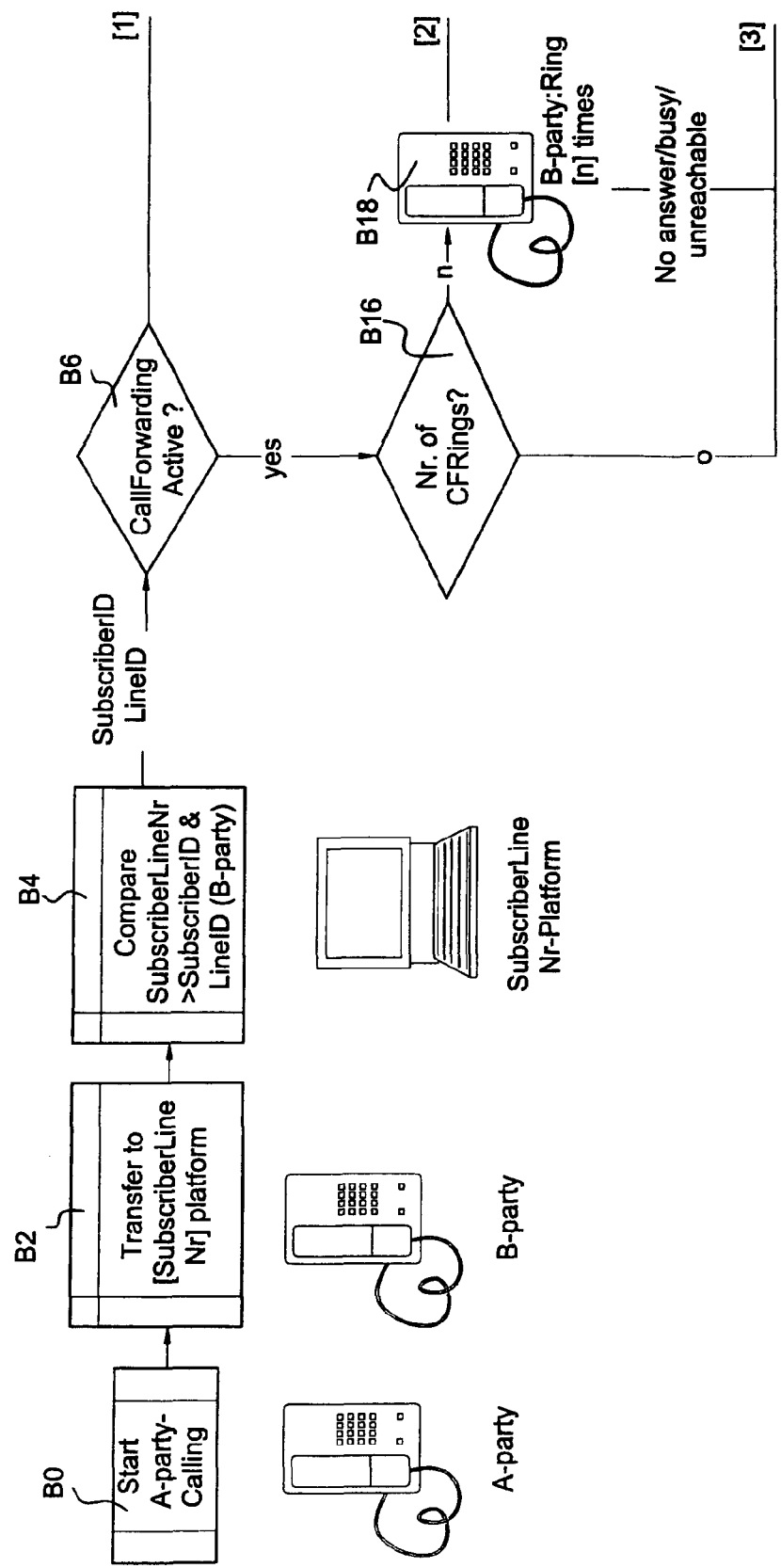
Fig 9.1

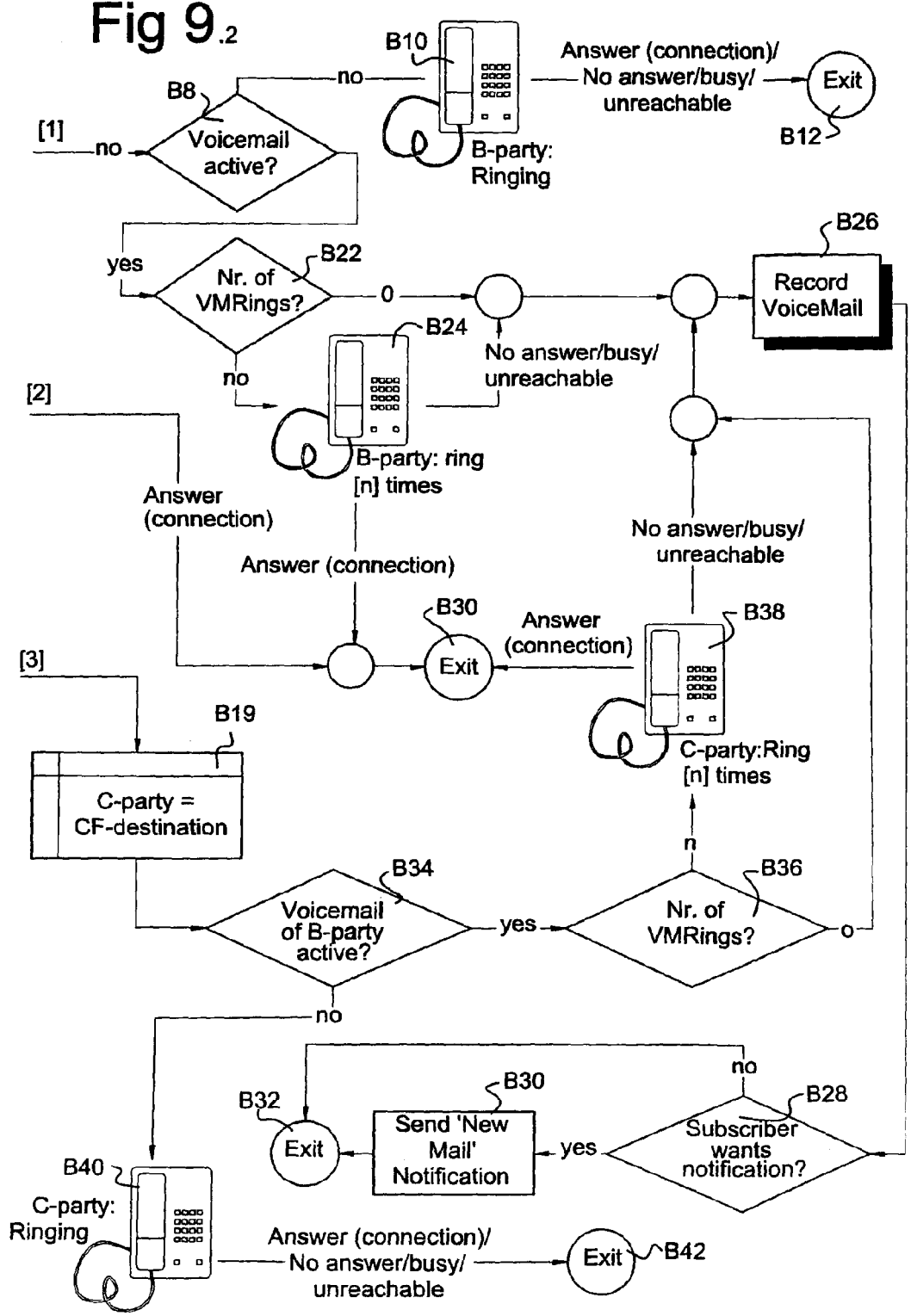

ELECTRONIC CALL ASSISTANTS WITH SHARED DATABASE

The invention relates to a telephone exchange arranged to communicate with a plurality of communication units comprising at least one set of communication units associated with one or more subscribers, and to provide an electronic call assistant platform to said at least one set of communication units, said electronic call assistant platform comprising at least a first electronic call assistant associated with one subscriber and a second electronic call assistant associated with said one subscriber, the first electronic call assistant having access to a distinct first database, the second electronic call assistant having access to a distinct second database.

Such a telephone exchange is known from U.S. Pat. No. 5,652,789 ("Wildfire") which describes a computer-based electronic call assistant which is arranged, inter alia, to receive and manage incoming calls to a subscriber. The electronic call assistant, after having received the incoming call, establishes a first communication link with the caller and a second communication link between the caller and the subscriber. It then operates in a foreground mode. After having established the communication links it shifts to a background mode in which it monitors the communication between the caller and the subscriber. By means of a summoning command (i.e., the spoken command "Wildfire") the electronic call assistant can be switched back to the foreground mode in which it is able to carry out several commands given by the subscriber. Thus, in "Wildfire", the electronic call assistant is an intermediary between the subscriber and the caller. The caller gets access to the electronic call assistant by dialing a telephone number associated with the electronic call assistant. In order to make use of the functionality of such an electronic call assistant a new subscriber to the electronic call facility is given a new telephone number associated with the electronic call assistant.

After having established the first communication link, the electronic call assistant of "Wildfire" assists the caller to trace the subscriber to whom the caller wants to be connected. The electronic call assistant, e.g., checks whether the subscriber is already calling, whether the subscriber is away, or does not want to accept any telephone calls. The electronic call assistant may even try to locate the subscriber in an other place where he is supposed to be at the moment of calling according to a schedule made up by the subscriber (call forwarding facility). The electronic call assistant may, for instance, try to reach the subscriber either on his fixed or mobile telephone, as indicated by the subscriber. If any of the attempts of the electronic call assistant to locate the subscriber, and thus to establish the second communication link, fails it may request the caller to leave a message in the voice mail box and send an e-mail message to the subscriber's workstation.

When the subscriber is present but busy with another telephone call, the electronic call assistant may briefly interrupt the actual call to notify the subscriber of the waiting call and request him whether he wishes to be interrupted by the waiting caller.

Other options of the electronic call assistant disclosed by "Wildfire" are managing a schedule of the subscriber, sending messages, sending reminders to the subscriber, and keeping records as to persons, groups of persons and places, as well as telephone records.

The "Wildfire" system is able to accept both spoken commands and electronic commands, e.g., generated by the keys of a telephone apparatus. The electronic call assistant sends its messages to the subscriber either by artificial spoken language or by messages shown on a monitor or the like.

All these known facilities may be present or added to the concept of the present invention which will be explained below.

Problems related to the electronic call assistant of "Wildfire" are as follows. First of all, in many countries people do not want to change their telephone number when they obtain the additional functionality of an electronic call assistant In the concept of "Wildfire", people loose all the telephone numbers associated with all different telephone numbers they wish to connect to the electronic call facility. For instance they have, e.g., one number related to a fixed telephone and one to a mobile telephone, and they receive one new number instead. Then, the electronic call assistant is able to manage incoming calls to this new number and people could indicate, e.g., that they want to forward those calls to either their fixed or mobile telephone. However, there is a desire to keep different telephone numbers for different telephone units. For instance, many people wish to give their mobile number only to a limited group of people whereas they agree to publish their fixed telephone number to everybody.

This could be solved by providing a different electronic call assistant to each of the different telephone numbers. Then, there would be no need to provide new telephone numbers for new electronic call assistants. When a user has two or more telephones, for instance, one fixed telephone (for instance either PSTN or ISDN) and one mobile telephone (for instance GSM) he would have several electronic call assistants. All these electronic call assistants could support the user by guiding him through all services offered by the telephone company. However, people would have increasing difficulties with all services offered for the different telephone numbers they have. Moreover, people get the feeling that services, although being comparable for fixed and mobile telephone units feel increasingly different. People are becoming tired of keeping track of all these ever changing services. They like to get more control over all these services. Especially, they like to have control over their attainableness for certain callers in certain situations.

The present invention provides a solution to the problems referred to above. It is directed to enhancing the user-friendliness of telephone systems while still offering the possibility of using many different services without the need to change telephone numbers in case of obtaining electronic call assistant facilities for a plurality of different telephone numbers.

To obtain this object the present invention provides a telephone exchange as defined at the outset, wherein the first and second electronic call assistants share a common data base.

By sharing a common data base, and preferably the electronic call assistants being arranged to be able to communicate with one another, a subscriber having two or more telephone units each with its own electronic call assistant, will be guided through all possible services from all of his telephone units by using one of his telephone units only.

The first and second electronic call assistants are associated with one subscriber and may present themselves to the subscriber with the same name. When the subscriber has e.g. fixed and mobile telephones, when he wishes to be supported by an electronic call assistant he enters his electronic call assistant platform, which for instance sends the announcement "I am your call assistant X". The platform knows through CLI (Calling Line Identification) with which telephone (fixed or mobile) the caller has entered the platform. Depending on the telephone used (fixed or mobile) the caller may be supported in another way. Especially, the caller might be supported in the following way. When using, for instance, his mobile telephone, especially his mobile telephone settings and not his fixed telephone settings may be amended. It is, then, more user-friendly when the different electronic call assistants present themselves to the user with different names. By presenting themselves as separate electronic call assistants it is always clear to both user and system which settings are the subject of the dialogue (in this case the settings of the mobile telephone, as well as possible common setting).

Preferably, the common database comprises at least a common voicemail box and settings related to the common voicemail box.

Moreover, preferably the common database comprises at least a common address book and settings related to the common address book.

The access to the electronic call assistants may be protected by personal identification numbers (PIN).

Moreover, arrangements may be made to allow access to either one of the electronic call assistants to a user of a third communication unit after the user has inputted both the personal identification number concerned and the calling line identification concerned by means of the third communication unit.

The present invention also relates to a method of communicating by means of a telephone exchange arranged to communicate with a plurality of communication units comprising at least one set of communication units associated with one or more subscribers, the method including:

providing an electronic call assistant platform to said at least one set of communication units, said electronic call assistant platform comprising at least a first electronic call assistant associated with one subscriber and a second electronic call assistant associated with said one subscriber;

allowing said first electronic call assistant access to a distinct first database;

allowing said second electronic call assistant access to a distinct second database;

allowing the first and second electronic call assistants access to a shared common database.

Thus, the invention provides an electronic call assistant platform with a plurality of electronic call assistants to subscribers. Each subscriber who has more than one telephone unit may subscribe to the provision of one electronic call assistant per telephone unit. The subscriber himself informs the telephone company which telephone units must be provided with such an electronic call assistant and which one of them must share a common database.

The electronic call assistants who share a common database are thus able to support one another. They are, for instance, both able to set the settings of the common database and update the content of the common database, whereas they are both able to access the content of their own database. Principally, when the subscriber uses his mobile telephone unit he will be assisted by the electronic call assistant related to the mobile telephone unit and if he uses his fixed telephone unit he will be supported by the electronic call assistant related to the fixed telephone unit.

As in the prior art, the electronic call assistants will, preferably, be controlled by voice recognition. Since the electronic call assistants share a common database, it is easier for them to be informed of any desire to forward a call or to obtain information.

It does not matter which one of the telephone units is used, it is always possible, for instance, to set the voicemail on or off without using difficult codes comprising * or #. Moreover, when the voicemail facility is used, a user can always access the voicemail box by either one of his telephone units. He does not need to listen to voicemail boxes of two different telephone units.

Moreover, the electronic call assistants may be arranged to assist the subscriber for calling back persons without having the need to input numbers using the keys of the telephone unit: the subscriber simply says the name of the person to be called and the electronic call assistant does the rest.

The only number that the subscriber needs to recall is the number to get access to the electronic call assistant platform.

When the telephone units are implemented as personal-computer-like arrangements, the electronic call assistants may also support e-mail and/or facsimile facilities. The data of these e-mails and facsimiles will then be stored in the common database which is accessible to the group of electronic call assistants associated with the group of communication units belonging to one subscriber (or a group of subscribers).

The concept of the present invention may also be applied to telephone units used by a plurality of people living together and using one or more telephone units together. In such a situation, different electronic call assistants, and different groups of co-operating electronic call assistants in the electronic call assistant platform, may be defined through combinations of calling line identification (CLI) and different personal identification numbers (PIN) for different persons.

The invention will now be explained with reference to some drawings which are intended to illustrate the invention only and not to limit its scope.

FIG. 1 shows in a schematical way how telephones communicate with one another through a telephone exchange;

FIG. 2 schematically shows the electronic call assistant platform in accordance with the present invention;

FIGS. 3.1 and 3.2 show a top level flowchart for possible steps carried out by the electronic call assistant platform;

FIG. 4 shows a flowchart of an access procedure providing access to an electronic call assistant;

FIGS. 5.1 and 5.2 provide a schematic overview of the flowchart for the Main Menu of the electronic call assistant platform;

FIGS. 9.1 and 9.2 show a flowchart of steps carried out by the electronic call assistant platform when a party wishes to call another party while using the electronic call assistant platform in accordance with the invention.

Figure 1:
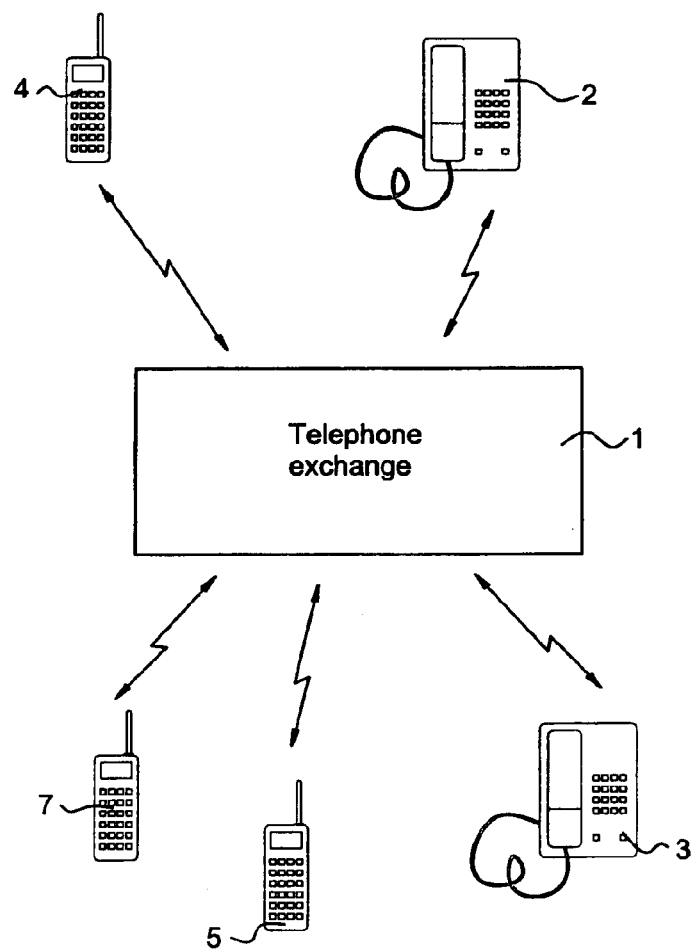

As shown in FIG. 1, a telephone exchange 1 provides communication between several telephone units 2, 3, 4, 5, and 7. These telephone units may be fixed or mobile. Moreover, it is envisaged that instead of fixed or mobile telephones, telecommunication units in a form of personal computers may also be used. Such telecommunication units (not shown) then should be provided with a microphone and a loudspeaker in order to allow it to function as a telephone. As a further alternative, the invention may be applied to personal computers communicating through e.g. the Internet for transmitting and receiving e-mails and facsimile messages. Moreover, the telephone exchange 1 may comprise processors controlled by software and/or digital/analogue circuits as the case may be. The telephone exchange components necessary to perform the required functions need not be physically located in one location.

Often, one and the same person has both a fixed telephone 2 and at least one mobile telephone 4. Still, that person wishes to have a simple way of receiving voicemail for both his fixed telephone 2 and his mobile telephone 4, without having to deal with different procedures. To that end, the telephone exchange 1 is provided with an electronic call assistant platform 11.

Parts of the electronic call assistant platform 11, such as databases or parts thereof, may be distributed among a number of telephone exchanges. There is no strict necessity to have all databases in one and the same location.

As shown in FIG. 2, the electronic call assistant platform 11 comprises an access module 6. The access module 6 is, preferably, based on "Calling Line Identification" (CLI-based). This means that the first step in an identification process is based on the telephone number of the telephone used by a user to establish a telephone call with another party. The access module 6 provides possible access to one of a plurality of electronic call assistants 12, 14. In FIG. 2, the situation is shown that there is a first electronic call assistant 12 for the fixed telephone 2 and a second electronic call assistant 14 for the mobile telephone 4. It is assumed that the fixed telephone 2 and the mobile telephone 4 are of the same subscriber who wishes to have his services of the telephone company through both his fixed telephone 2 and his mobile telephone 4 shared as much as possible. However, the invention also relates to subscribers having any other number of fixed telephones and/or mobile telephones. For each of the distinct telephones a separate electronic call assistant within platform 11 will be provided.

The electronic call assistant 12 operates in accordance with a Main Menu 8. The electronic call assistant 14 operates in accordance with a Main Menu 10. Preferably, the electronic call assistants 12,14 are arranged to communicate with one another when necessary, as indicated with arrows 13. In practice, the Main Menu's 8,10 will, preferably, be different routes followed within one single Main Menu, e.g., the Main Menu A10 as illustrated in FIGS. 3.1, 5.1, and 5.2. Communication 13 between call assistants 12,14 may, e.g., be necessary when setting voicemail greetings for the different telephones 2,4 as will be explained hereinafter with reference to FIG. 7. Alternatively, a user can directly request access to another electronic call assistant, as will be explained with reference to blocks A 108/109 in FIG. 5.1.

The electronic call assistant platform 11 comprises a database 16. The database 16 is subdivided into 3 portions:
- a first database portion 36 accessible to the first electronic call assistant 12 only,
- a second database portion 38 accessible to the second electronic call assistant 14 only, and
- a third database portion 40 accessible to both electronic call assistants 12,14.

When there would be more electronic call assistants for one subscriber, there would also be more database portions, but they would all share one common database portion 40.

The common third database portion 40 comprises data as to a common voicemail box 24. Preferably, also data as to a common directory 26 are provided in the common third database portion 40. Moreover, the common third database portion 40 will comprise data as to settings 28 related to the common database portion 40.

The first database portion 36 comprises data 18 related to whether or not the electronic call assistant 12 has put the voice mail functionality on or off. Moreover, the first database portion 36 comprises data 20 indicating whether or not the electronic call assistant 12 has a Call Forwarding (CF) facility. The database portion 36 also comprises data 22 related to settings.

The second database portion 38 comprises data 30 as to whether or not the voice mail facility for electronic call assistant 14 is put on or off, data 32 as to whether or not the call forwarding facility is active or not, and data 34 related to settings.

The invention will be further explained with reference to some flowcharts. An annex provides a legend for the flowcharts.

FIGS. 3.1 and 3.2 give a flowchart of the top level of the electronic call assistant platform in accordance with the invention.

First of all, the flowchart of FIGS. 3.1 and 3.2 will be described in general terms. Further explanation of the sub-modules of FIGS. 3.1 and 3.2 will be given below.

The top level flowchart of FIGS. 3.1 and 3.2 start with an Access module A2. In this module, a subscriber tries to get access to his electronic call assistant 12, 14. If the access procedure fails, the subscriber gets a message A4 indicating him to call the customer service. Instead of such an indication, the subscriber may be directed automatically to the customer service through an automatic link.

If the access procedure is successful a "PlayStartNotificationsmodule" A6 is entered.

Then, a Start Function module A8 is entered. In the Start Function module A8, the system starts with a function as set by the user in a settings menu. In FIGS. 3.1 and 3.2, the situation is shown that the user can have indicated that he wishes the Start Function A8 to start with either a Play Voice Mail module A14, a Main Menu module A10, a Set Voice Mail module A16, a Call Forwarding module A18, or a Name Dialing module A22.

Preferably, the Start Function module A8 is arranged such that when the user has not set an express start function the system automatically starts with the Main Menu A10 (default function).

After the Main Menu module A10, one of the possible steps is a jump to another electronic call assistant, and thus switching to the Main Menu of the other electronic call assistant, step A12. Actually, this means that the Main Menu module A10 is entered again but with "Entrance"="Switch" which results in e.g. another greeting message and access to another database via the other electronic call assistant.

After the Main Menu module A10 one of the following sub-modules may be entered, depending upon the choice made by the user:
- Play Voice Mail module A14,
- Set Voice Mail module A16,
- Call Forwarding module A18,
- Turn Off Call Forwarding module A20,
- Name Dialing module A22,
- Turn Call Waiting Off module A28,
- Name Add module A30,
- Settings module A24, and
- Name List module A26.

Apart from the Name Dialing module A22 all these sub-modules have their outputs connected to the input of the Main Menu A10.

The Name Dialing module A22 has two possible outputs. The first output is connected to the Main Menu module A10 directly and is used when the name dialing procedure has failed. The second output is connected to a Call Set Up module A32 and is used when the name dialing has been successful.

The Call Set Up module A32 has its input also connected to the output of the Play Voice Mail module A14. This connection is used when, in the Play Voice Mail module A14, the option is used for direct call back facility.

The Call Set Up module A32 may also be entered by the output of the Main Menu module A10 directly in case of an automatic call of a customer service.

The output of the Call Set Up module A32 is connected to the input of the Main Menu module A10.

Hereinafter, some of the sub-modules will be explained in further detail: FIG. 4 provides an example of the Access module A2.

Users can get access to the electronic call assistant platform 11, e.g., through dialing a predetermined telephone number. Preferably, the predetermined telephone number is the same for the fixed and mobile telephones of all subscribers.

The electronic call assistant platform checks whether a calling line identification (CLI) is available, step 201; if the CLI is available, the program carried out by the electronic call assistant platform checks whether the CLI matches with any subscriber identification number, step 202. If the CLI matches with the identification of one of the subscribers to the electronic call assistant platform the program checks whether or not a personal identification number (PIN) facility is enabled for the electronic call assistant concerned, step A203.

If no PIN facility is set the program jumps to step A204 in which access is given to the electronic call assistant concerned: the program continues with step A6 (FIG. 3).

If no CLI in step 201 is available, the program continues with sub-module A205 in which the user is requested to enter a PIN. The content of such a sub-module is known to persons skilled in the art and will not be further illustrated in detail. After having received a PIN the program continues with sub-module A206 in which the user is requested to enter the identification of a telephone number, i.e., a step which is the manual equivalent of the CLI matching step A202.

In step A207, the program checks whether the PIN and the ID (telephone number) inputted by the user match with one another. If so, the program continues with step A204. If not, the user is informed accordingly, step A208, and the user gets another opportunity to input the correct PIN and ID.

Step A209 shows that the user gets two additional opportunities to input the correct PIN and ID. If the user is not successful with two new attempts the program establishes that the access procedure has failed and continues with step A4 (see also FIG. 3).

If, in step A202, the program has established that the CLI does not match with any subscriber identification the program continues with step A205 which is already explained above.

If, in step A203, the program establishes that a PIN is enabled for the ID concerned the program continues with step A211 in which the user is requested to enter the PIN concerned. The module A211 is similar to module A205.

After module A211, the program checks in step A212 whether the PIN and the ID match with one another. If so, the program continues with step A204. If not, the program continues with sub-module A206 which has already been explained above.

It is observed that the flowchart of FIG. 4 provides the possibility for a subscriber to the electronic call assistant platform to get access to one of his own electronic call assistants 12,14 through the use of a telephone of another party in two different ways. The first way is by using a telephone which is no member of the electronic call assistant platform. If such a telephone is used by a subscriber of the electronic call assistant platform, and in step A202, the platform has established that the CLI does not match with a subscriber identification, the program continues with step A205. In step A205 the user gets the opportunity to enter his PIN and in step A206 he gets the opportunity to enter the identification of his own telephone unit. Then, in step A207, the program establishes that the PIN and ID do match for a specific electronic call assistant, i.e., for a telephone unit currently not used by the user but which is a member of an electronic call assistant platform. The electronic call assistant associated with that PIN and ID is than accessed through step A204.

A second way is the following. If a user uses a telephone unit of another party which is a member of the electronic call assistant platform, the program continues to step A203 because the program will establish that the CLI of the telephone unit used is a member of the platform. However, in step A203, if a PIN is enabled for the telephone unit used, the program continues with sub-module A211. If the user then inputs his own PIN and not the PIN associated with the telephone unit used, the user gets the opportunity to input both his own PIN and the ID of this own telephone unit through steps A212, A206, and A207. Then, he gets access to his own electronic call assistant.

It is observed that, with the flowchart of FIGS. 5.1 and 5.2, a user using a telephone unit of another party directly gets access to the electronic call assistant associated with that telephone unit if the PIN for that telephone unit is not enabled.

FIGS. 5.1 and 5.2 show a possible flowchart of the Main Menu A10.

The Main Menu has three possible values of input parameter "Entrance". As is evident from FIG. 3.1, the main menu can be entered either as output of one of the modules A14-A32 ("Entrance"="BackToMain"), as output of module A12 ("Entrance"="Switch"), or as output of Startfunction A8 ("Entrance"="Access"). In dependence on the value of "Entrance", a different announcement A102, A103 or A104 will be given the user.

In announcement A102 the user will receive the message "Switched to [other PP-line]", in which "[other PP-line]" is the name of the other call assistant to which he is transferred.

In announcement A103 the user will be informed that he has re-entered the main menu, and in announcement A104 a general greeting announcement will be played back.

At window A105 the user must indicate his choice to the electronic call assistant, preferably, by voice instructions. The options currently envisaged are: LineLabelCurrentOtherLineID A106, LineLabelOtherLineID A108, Messages A110, Set Voice Mail A112, Forward my calls A114, Turn Off Call Forwarding A116, Call A118, Call [name] A120, NameList A122, Settings A124, Turn Voice Mail on A126, Turn Voice Mail off A128, Turn Call Waiting off A130, [call] Customer Service A132, and Add a name A134. Future options may be: Play messages from [line label] A136, and Forward calls to [name] A138. Of course, further options may be implemented in a similar way.

Each of the options A106 through A138 is selected by the user and depending upon the selection made by the user, the program steps to an associated further process.

In step A106, it is established that the user has erroneously requested to communicate with his current call assistant. This is detected, and the user is informed of his mistake e.g. by an announcement "I'm here" A107 of the system.

After step A107, the system returns to the Main Menu via announcement "Main Menu" A103.

In step A108, the system establishes that the user has indicated a wish to be transferred to another call assistant. The user is then connected to the other call assistant so identified via module A12.

If the user has indicated that he wishes to hear the messages from the voicemail, step A110, the program plays the registered voicemail messages, step A14. Programs for playing voicemail messages are known to persons skilled to the art.

By selecting Set Voice Mail, step A112, the program will continue with sub-module A116 in which the user is allowed to set different kinds of settings of a voicemail box. The user can for instance specify the number of times the phone will ring (0-9 for instance) before a caller will be directed to the voicemail facility. If there is no answer, then the caller will be asked to leave a message in the voicemail box. If the called line is busy or a mobile telephone is not reachable, the caller will be forwarded to a voicemail facility directly. Optionally, the subscriber is also able to specify a greeting message for his voicemail box in this module.

Through step A126 the program also continues with the Set Voice Mail sub-module A16 and the user gets the opportunity to turn his voicemail facility on. Through step A128 the program also continues with Set Voice Mail-module A16 and the user gets the opportunity to turn the voicemail facility off.

The Call Forwarding facility A18 is entered when the user selects step A114: Forward my calls. Through step A116, the user is able to turn off the Call Forwarding facility. Turning off the Call Forwarding facility is dealt with in the sub-module A20.

Through step A118, the user will be directly connected to a telephone unit of another party of which he tells the telephone number to his electronic call assistant. The program then enters the Name Dialing sub-module A22. The content of such Name Dialing sub-modules is known to persons skilled in the art and will not be explained in detail here.

Through step A120, a user can be connected to the telephone unit of another person of which he tells the name to the electronic call assistant.

A user can also be connected to the customer service by indicating so to the electronic call assistant, step A132. After step A132, the program enters the Name-Dialing sub-module A22.

When the user has entered the NameList sub-module A26 through step A122 the user is provided with the possibility to add, remove, or change names in the common address book 26 (see FIG. 2). Also, the user may instruct the program to play the entire list of the addresses in the common address book 26 in the NameList sub-module A26.

After the user has selected the Settings option, step A124, the program continues with Settings sub-module A24, details of which are explained with reference to FIGS. 6, 7 and 8.

After having selected the Settings option, step A124, the program enters the Settings sub-module A24 in step A240. In step A241 the user is requested to enter his selection of the setting he wishes to make.

Figure 6:
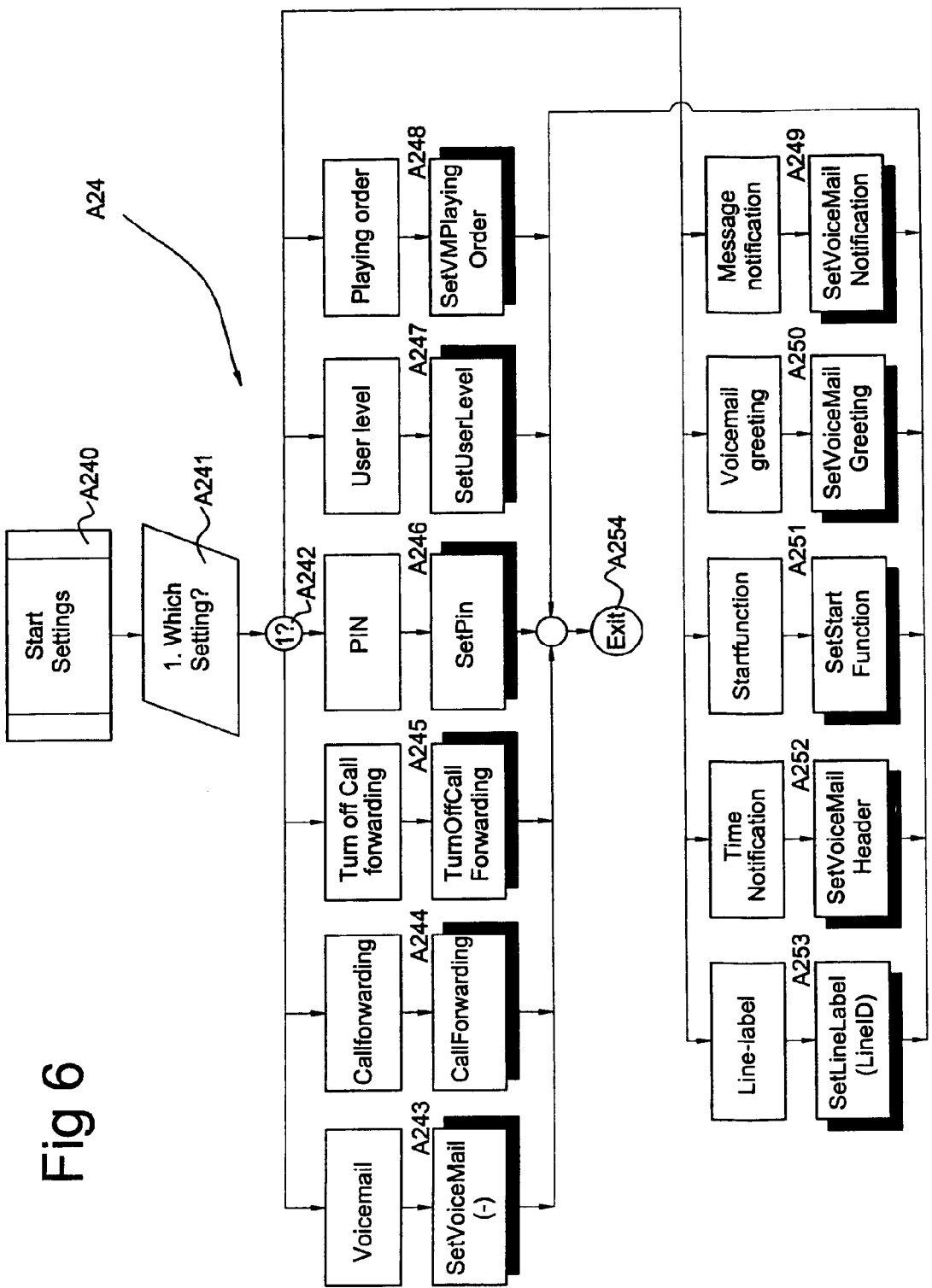
FIG. 6 shows a flowchart for the module "Settings" of the top level flow chart of FIG. 3.

FIG. 6 shows several possible selection options. It is observed that some of these settings can also be accessed directly through the Main Menu in FIG. 5. The optional settings shown in FIG. 6 are: Set VoiceMail A243, Call Forwarding A244, Turn Off Call Forwarding A245, Set PIN A246, Set User Level A247, Set VoiceMail Playing Order A248, Set VoiceMail Notification A249, Set VoiceMail Greeting A250, Set Start Function A251, Set VoiceMail Header A252, and Set Line Label A253. All these sub-modules have the same exit A254. Depending on the arrangements made, some of these settings will be line specific, i.e., either stored in boxes 22, 34 (FIG. 2), or as shared settings in box 28 (FIG. 2).

In sub-module A246, the user can set his own PIN-code, which comprises for instance four digits. This PIN-code is preferably always the same for any kind of access to the electronic call assistant platform, be it through his mobile telephone, his fixed telephone or any other access. Users can specify whether a PIN is necessary at logging in. In one embodiment, a PIN is not necessary for gaining access with the users' mobile telephone. These mobile telephones are usually equipped with a PIN-code of their own. Therefore, an additional PIN-code is not necessary. When gaining access to the electronic call assistant platform from an unknown telephone unit the PIN will, preferably, always be necessary.

When a user has entered sub-module A247, he can set the user level to either beginner or expert level for the entire service. This affects only the length of the prompts used. The user level is intended to be specific to a number of modules (tasks). If the user has performed a certain task more than a predetermined number of times (for example ten times) the prompts used can be shortened (i.e., set to expert level). Through sub-module A248, a user can set a preference for the order of playing voicemail messages.

In sub-module A249, the user can indicate if he wants to be notified about new messages when entering the system. If the setting "voicemail access notification" is turned on, than users will receive the notification immediately upon logging in. If this setting is turned off, users will only receive this notification before listening to the messages.

In sub-module A250, the user can set a personal voicemail greeting.

Figure 7:
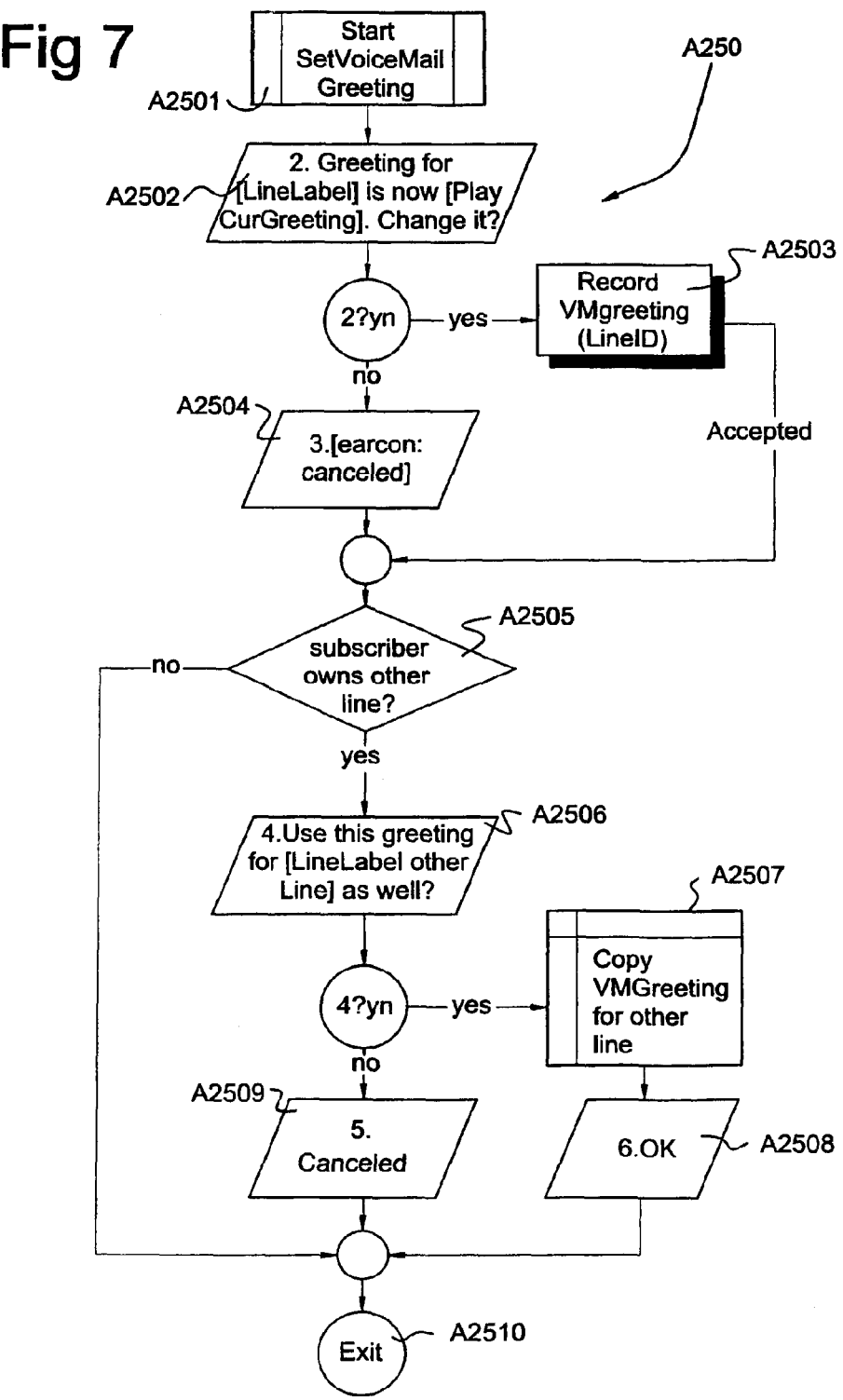
FIG. 7 shows a flowchart for the module "SetVoiceMail Greeting" of FIG. 6.

FIG. 7 shows a possible flowchart for the sub-module A250. After the program has entered the sub-module A250 in step A2501, the user hears a message like "greeting for [line label] is now [play current greeting]. Do you like to change it?", step A2502.

If the user inputs YES to this question, the program continues with sub-module A2503 in which the user is requested to input the new desired greeting which is done in a way known in the art, and the program continues with step 2505. If, in step A2502, the answer of the user is NO, the program continues with step A2504. In this step the user hears an announcement to confirm this.

After step A2504, and after step A2503, the program continues with step A2505 in which the system checks whether or not the subscriber owns other lines. If the answer is YES, the program continues with step A2506 in which the user is requested whether or not he wishes to have the same greeting on his other line too. If the answer is yes, in step A2507, the currently active electronic call assistant transfers control to the electronic call assistant associated with the other line which copies the voicemail greeting for the other line. If step A2507 has been carried out correctly, the user is informed accordingly in step A2508, and the program jumps to the exit A2510.

If in step A2505 the system has established that there are no other lines, the program directly jumps to the exit A2510.

If after step A2506, the user has indicated that he does not wish the same greeting for his other line, the user is informed that a possible amendment of the greeting for the other line is cancelled, step A2509. Then the program continues with step A2510.

The greetings for each of the lines can be stored in the different line specific storages 36 and 38, respectively. However, alternatively it is possible to store all greetings in common database 40, and thus to provide access to these greetings to all present call assistants, together with authorization rules about use and possibilities to amend them.

In the flow chart according to FIG. 7 the voicemail greetings of all different telephone units of the same subscriber may be amended while being assisted by one of the electronic call assistants only. To that end the electronic call assistant used communicates with the other electronic call assistants for setting the voicemail greetings of the different telephone units concerned.

Returning now to FIG. 6, in sub-module A251 the user can indicate with which function he always wants to start when he enters the electronic call assistant platform, i.e., what the settings are of the Start Function sub-module A8 (see FIG. 3.1). As mentioned before, the default value is Main Menu (i.e., "Entrance"="Main Menu" for module A10).

In sub-module A252, the user can indicate whether he wants the "time of delivery" in the header of a voicemail message to be vague, like "yesterday morning", or to be more precise, "April 4, 1.30 PM". The voicemail header setting is general, i.e., set in settings 28, and not line-specific.

Figure 8:
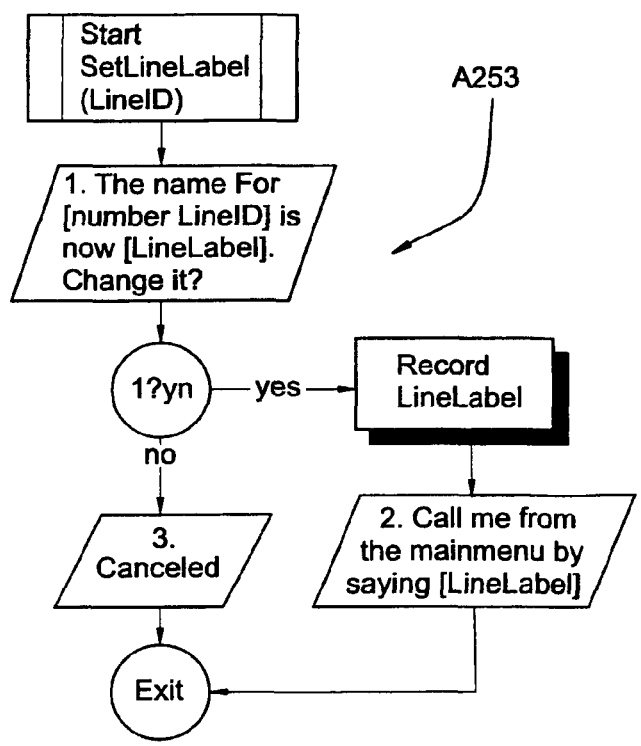
FIG. 8 shows a flowchart for the module "SetLineLabel" of FIG. 6.

In sub-module A253 as explained in FIG. 8, the user can give the assistant a predetermined name, with which the user can call that "line-assistant" from the Main Menu of the other "line-assistant". Thus, each line has an electronic call assistant with a separate name.

Now the description returns to FIG. 5. Through step A122 the user can enter the NameList sub-module A26. In this sub-module A26, the system first checks whether the name list is still empty. If it is still empty the user is only allowed to add a name to the name list. After that the system checks whether the list is full and if so, the system requests the user to remove a name from the list before he is allowed to add a further name. The user has several options: add a name, remove a name, change a number or check the name list.

When the user wishes to add a name he is requested to say the name he wants to add to the name list. Then the system checks whether the name is too short or too similar to another name in the list. Finally, the user is requested to pronounce the name again until two entries are sufficiently alike to add them to the name list. Then the system checks whether it already knows the number. If not, the user is prompted to enter the number. The syntax is checked and the system also checks whether or not the number is already in the list with another name. This is allowed but the user is informed about that.

The user is requested whether or not he wants to remove a name from the list. If so, the system carries out the removal.

The user is also allowed to change a recorded number for a name. The system checks whether or not this is a valid number. Moreover, the system checks whether or not the user has forwarded his calls to this name. If the user did, the call forwarding number will be changed as well.

Moreover, in sub-module A26, the user can indicate whether he wants to hear only the names of the people in his name list or the numbers as well. Preferably, the user can navigate through the name list by saying "next" and "stop".

Through step A130, the user can indicate to the electronic call assistant platform that he wishes to turn off the call waiting facility. In a call waiting facility, the electronic call assistant can put next callers on hold when the telephone unit called is busy and the electronic call assistant will then inform the user of the called telephone unit accordingly. Such a call waiting facility is known from the prior art as such and does not need any detailed explanation here.

Through step A134, in which the user for instance says "add a name", the electronic call assistant platform directly switches to the Name Add sub-module A30 (see FIG. 3.2). In this module, the user can directly add a name, i.e., a name and a telephone number to the common directory 26 (see FIG. 2).

The option of step A136 refers to requesting the electronic call assistant associated with the telephone unit which a user is calling to request the electronic call assistant of another line to play the content of the voice mail box of the other line. In the option of step A138, the user gets the possibility to forward a call to another person by telling the electronic call assistant the name of that other person.

FIGS. 9.1 and 9.2 provide a flowchart of how the system works in relation to incoming calls, i.e., callers trying to reach the telephone unit of a subscriber to the electronic call assistant platform. In step B0, a caller, called "A-party", starts by dialing the number of either a fixed line or a mobile line of a "B-party" being a subscriber.

In step B2, the call is transferred to the electronic call assistant platform, whereas in step B4 it is evaluated whether or not the telephone number of the called party is a member of the electronic call assistant platform.

If the called line belongs to a telephone unit which is a member of the electronic call assistant platform, it is checked whether or not the call forwarding facility of the called telephone is active, step B6.

If the call forwarding facility is not active, it is checked whether or not the voice mail facility of the called telephone unit is active, step B8. If the voice mail facility is not active the called telephone unit will ring. As a result either the connection is made, or the telephone unit appears to be busy, or the called party doesn't answer the ringing telephone unit.

If in step B8 it is established that the voice mail facility is active, the program checks, in step B22, how many times the telephone unit must ring before the program must jump to the voice mail registration facility. In step B24 the telephone unit rings the said number of times (n) before the call is transferred to the voice mail registration facility. If n=0 then the call is directed to the voice mail registration facility without delay, and step B24 is bypassed. If in step B24 the telephone is answered, the connection will be made and the voice mail registration facility will not be used.

If the caller reaches the voice mail registration facility in step B26 the voice mail message of the caller is registered in a way known in the art. After step B26, the program checks whether or not the subscriber has set the system to be notified of new voice mail messages. If so, a "new mail" notification will be transmitted to the subscriber, step B30.

Returning now to step B6, if it is established that the call forwarding facility is active, e.g. to a "C-party", then the program jumps to step B16.

In step B16, the program checks a predetermined recorded number of rings for the B-party before the system must switch to the C-party. In step B18, the program provides for ringing the correct number (n) of rings of the telephone unit of the B-party. If this telephone unit is answered, a connection will be made. If the B-party telephone unit is not answered within n rings, the calling party is switched through to the C-party, step B19. If n=0, the program bypasses step B18 and switches the calling party through to the C-party directly.

In step B34, the program checks whether or not the voice mail facility of the B-party is enabled. If not, the program continues with step B40 in which the telephone unit of the C-party will ring when it is not busy. If not busy, the connection may be made. If in step B34 it is established that the voice mail facility of the B-party is enabled, in step B36, the program will check the number (n) of times that the telephone unit of the C-party must ring before the voice mail registration facility of the B-party is made active. After n rings the program continues with the sub-module B26 in which the voice mail message of the caller may be recorded. Alternatively, in step B38, the telephone unit of the C-party may be answered and the connection be made. If in step B36 it is established that n=0, the step B38 is bypassed, and the program directly continues with sub-module B26 to record a voice mail message of A-party (the caller).

The invention claimed is:
1. A method of communicating by means of a telephone exchange arranged to communicate with a plurality of com- munication units comprising at least one set of communication units associated with one or more subscribers, the method including:

provide an electronic call assistant platform to said at least one set of communication units, said electronic call assistant platform comprising at least a first electronic call assistant associated with one subscriber and a second electronic call assistant associated with said one subscriber;

allowing said first electronic call assistant access to a distinct first database;

allowing said second electronic call assistant access to a distinct second database; and allowing the first and second electronic call assistants access to a shared common database.

2. An electronic call assistant platform comprising:

an access module that provides access to a plurality of electronic call assistants, wherein a first electronic call assistant corresponds to a first telephone and a second electronic call assistant corresponds to a second telephone;

a main menu arranged to communicate with the plurality of electronic call assistants; and a database in communication with the main menu, the database including:
  a first portion accessible to the first electronic call assistant;
  a second portion accessible to the second electronic call assistant; and
  a third portion accessible to the first and second electronic call assistants.

3. The electronic call assistant platform of claim 2, wherein the first and second telephone each have a distinct calling line identification, and the first and second electronic call assistants have a fixed relation to the first and second telephones through the first and second telephone's calling line identifications.

4. The electronic call assistant platform of claim 2, wherein the third portion of the database comprises an address book.

5. The electronic call assistant platform of claim 2, wherein the access module provides access to the plurality of electronic call assistants through use of a personal identification number.

6. The electronic call assistant platform of claim 2, wherein the main menu is operable to receive voice commands.

7. The electronic call assistant platform of claim 2, wherein the electronic call assistant platform is accessible through a predetermined telephone number.

8. The electronic call assistant platform of claim 2, wherein the first and second electronic call assistants are associated with a common subscriber.

9. A method of accessing an electronic call assistant platform comprising:

providing a plurality of electronic call assistants, wherein each electronic call assistant corresponds with a distinct calling unit, and wherein the plurality of electronic call assistants are associated with a common subscriber;

determining whether a calling unit corresponds to any of the plurality of electronic call assistants; and if so, authorizing access to an electronic call assistant to which the calling unit corresponds if the calling unit matches with an identification of the common subscriber.

10. The method of claim 9, wherein determining whether the calling unit corresponds to any of the plurality of electronic call assistants comprises determining a telephone number of the calling unit and determining whether the telephone number matches to any of the plurality of electronic call assistants.

11. The method of claim 10, wherein authorizing access to the electronic call assistant comprises determining whether the telephone number matches the identification of the common subscriber.

12. The method of claim 9, wherein the identification of the common subscriber is a personal identification number.

13. The method of claim 9, further comprising receiving a voice command indicating a selection.

14. The method of claim 13, wherein the selection is indicative of an option selected from the group consisting of play voice mail, set voice mail, turn on call forwarding, turn off call forwarding, place a call, configure settings, turn on call waiting, turn off call waiting, and access customer service.

15. A method of managing incoming calls to an electronic call assistant platform, the method comprising:

providing a plurality of electronic call assistants, wherein each electronic call assistant corresponds with a distinct calling unit, and wherein the plurality of electronic call assistants are associated with a common subscriber;

receiving an incoming call from a calling unit;

determining whether a called telephone number by the calling unit belongs to the common subscriber and thus corresponds to a telephone number of one of the distinct calling units associated with the plurality of electronic call assistants;

if the called telephone number belongs to the common subscriber, determining whether options of an electronic call assistant associated with the one of the distinct calling units are operational, and if so, based on the options, transferring the incoming call to the electronic call assistant.

16. The method of claim 15, wherein the options of the electronic call assistant are selected from the group consisting of call forwarding and voice mail.

17. The method of claim 15, further comprising if the options of the electronic call assistant are not operational, ringing the one of the distinct calling units.

* * * * *